(12) United States Patent
Mersh

(10) Patent No.: US 9,875,112 B2
(45) Date of Patent: Jan. 23, 2018

(54) PROVIDING A TRUSTWORTHY INDICATION OF THE CURRENT STATE OF A MULTI-PROCESSOR DATA PROCESSING APPARATUS

(71) Applicant: ARM Limited, Cambridge (GB)

(72) Inventor: John David Mersh, Bottisham (GB)

(73) Assignee: ARM Limited, Cambridge (GB)

( * ) Notice: Subject to any disclaimer, the term of this patent is extended or adjusted under 35 U.S.C. 154(b) by 59 days.

(21) Appl. No.: 15/017,886

(22) Filed: Feb. 8, 2016

(65) Prior Publication Data

US 2016/0154655 A1 Jun. 2, 2016

Related U.S. Application Data

(63) Continuation of application No. 13/915,897, filed on Jun. 12, 2013, now Pat. No. 9,268,942.

(51) Int. Cl.
| | |
|---|---|
| *G06F 9/44* | (2006.01) |
| *G06F 15/177* | (2006.01) |
| *G06F 21/57* | (2013.01) |
| *G06F 1/26* | (2006.01) |
| *G06F 11/14* | (2006.01) |

(52) U.S. Cl.
CPC .............. *G06F 9/4401* (2013.01); *G06F 1/26* (2013.01); *G06F 21/575* (2013.01); *G06F 9/4405* (2013.01); *G06F 9/4418* (2013.01); *G06F 11/1417* (2013.01); *G06F 15/177* (2013.01); *G06F 2221/034* (2013.01)

(58) Field of Classification Search
CPC .... G06F 9/4405; G06F 15/177; G06F 9/4418; G06F 11/1417

USPC ................................................. 713/1, 2, 100
See application file for complete search history.

(56) References Cited

U.S. PATENT DOCUMENTS

| | | | |
|---|---|---|---|
| 5,410,713 A | 4/1995 | White et al. | |
| 5,737,615 A | 4/1998 | Tetrick | |
| 9,268,942 B2* | 2/2016 | Mersh | .................. G06F 21/575 |
| 2005/0138409 A1 | 6/2005 | Sheriff et al. | |
| 2007/0001697 A1* | 1/2007 | Dobberpuhl | .......... G06F 1/3203 324/750.3 |
| 2007/0288740 A1 | 12/2007 | Dale et al. | |
| 2010/0083365 A1 | 4/2010 | Gurumoorthy et al. | |

(Continued)

OTHER PUBLICATIONS

Extended European Search Report dated Apr. 22, 2015 in EP 14168961.2, 5 pages.

(Continued)

*Primary Examiner* — Michael J Brown
(74) *Attorney, Agent, or Firm* — Nixon & Vanderhye P.C.

(57) ABSTRACT

A data processing apparatus formed on an integrated circuit comprising: a plurality of processors; power control circuitry configured to control power up and power down of the processors; a read only memory for storing boot up software for booting up each of the processors. The power control circuitry is configured to respond to receipt of a check state request, to control one of the processors that is currently powered down to power up and to access the boot up software. The boot up software accessed in response to the check state request controls the processor to perform a measurement indicative of a current state of the data processing apparatus and to output a value indicative of the measurement.

6 Claims, 4 Drawing Sheets

(56) References Cited

U.S. PATENT DOCUMENTS

2013/0191670 A1* 7/2013 Haruki .................. G06F 1/3234
 713/323

OTHER PUBLICATIONS

U.S. Appl. No. 13/915,897, filed Jun. 12, 2013, Mersh.
Office Action dated Jun. 19, 2015 in co-pending U.S. Appl. No. 13/915,897, 12 pages.

* cited by examiner

PROVIDING A TRUSTWORTHY INDICATION OF THE CURRENT STATE OF A MULTI-PROCESSOR DATA PROCESSING APPARATUS

CROSS-REFERENCE

This application is a continuation of U.S. application Ser. No. 13/915,897 filed Jun. 12, 2013, the entire contents of each of which are incorporated herein by reference in this application.

TECHNICAL FIELD

The technical field relates to data processing data processing apparatus and in particular, to determining a trustworthy current state of a multiple processor data processing apparatus.

BACKGROUND

It is desirable to be able to determine whether or not a data processing apparatus is running correctly. In a data processing apparatus that is operating and receiving and transmitting data, both the code and the data are generally modifiable and therefore open to attack such that one cannot be sure that the result of any measurement performed has not been tampered with.

On power up of a data processing apparatus, there is a boot up process where boot up software that configures the system is executed. This is generally a secure process where boot up software that is stored in a read only memory ROM, located in a secure location is executed. This software may have access to secret data such as cryptographic keys that are stored in non-volatile storage which may only be accessible from this code. The boot up software cannot be tampered with being stored in ROM and can be used to load and validate software using the secret keys, such that at start up one can be sure that the data processing apparatus has not been tampered with and only validated code has been loaded. Once the data processing apparatus starts to execute code, receive and transmit data and respond to external control signals, the chances of the data processing apparatus being tampered with increases.

It would be desirable to be able to test the current state of a data processing apparatus at certain times to determine the current integrity of the data processing apparatus. Such a testing mechanism should itself be resistant to external attacks.

SUMMARY

A first aspect provides a data processing apparatus formed on an integrated circuit comprising:
a plurality of processors;
power control circuitry configured to control power up and power down of said plurality of processors;
a read only memory for storing boot up software for booting up each of said plurality of processors, said boot up software being accessible to said plurality of processors during power up; wherein
said power control circuitry is configured to respond to receipt of a check state request, to control one of said plurality of processors that is currently powered down to power up and to access said boot up software, said boot up software accessed in response to said check state request controlling said processor to perform a measurement indicative of a current state of said data processing apparatus and to output a value indicative of said measurement.

The inventor of the present technique recognised that processors are generally provided with boot up software that may have access to secure data not accessible to other code and which is itself inherently more secure than other software executed, being stored in ROM and thus, being fixed in hardware and unable to be changed. This software is provided to enable a data processing apparatus to be set up securely such that at least initially it can be trusted. However, once the data processing apparatus starts to operate and process data, it may be accessed by and have access to insecure processes and data and the security of the data processing apparatus may be jeopardised.

Many modern data processing apparatus have plural processors on a same chip that share memory, and perhaps peripherals. In order to preserve power these processors can be powered down when inactive and powered up again when required. When they are powered up again the boot up software will need to be executed. The present invention makes use of this property to use code run in response to a power up signal (boot up software) to check the current state of a processor and in this way the boot up software that is inherently secure can be activated and with some slight modification be used to initiate a test of the current state of the data processing apparatus.

In some embodiments, said data processing apparatus further comprises a secure data store for storing a key said secure data store is accessible to each of said plurality of processors during execution of said boot up software;
said processor on power up being controlled to sign said value indicative of said measurement using said key and to output said signed value.

Many processing apparatuses have keys stored securely that are only accessible during boot up. Once boot up has occurred such keys are invisible to the processing apparatus and this renders them very difficult to attack and therefore very secure. The current technique takes advantage of the presence of such very secure keys that are accessible only during boot up and uses one of them to sign the value indicative of the measurement. This means that the signed value can be tested to determine whether it has indeed been signed by the correct key and as the key is only available during boot up, if it has been signed by this key, then the value can be trusted to a high degree.

Signing code with a key is a well-known technique to ensure security and generally involves performing a mathematical operation such as a hash of a block of data and then performing another mathematical operation on the hash using the key. This signature value can then be analysed to determine whether the hash value was signed with a particular key.

In some embodiments, said key comprises an asymmetric private key, said key being accessible to said plurality of processors executing said boot up software and not being accessible to said plurality of processors during execution of code other than said boot up software.

The key may be an asymmetric private key such that it is unique to the apparatus but there are public versions of the key that are known and that can be used to determine whether or not the private key was used to sign the data without the need to know the private key itself. This is a well-known and very useful cryptographic technique that is used in determining the security of many systems, allowing the presence of a private key to be determined without actual knowledge of the key itself.

In some embodiments, said boot up software comprises secure boot up software that is only accessible to said processor during power up, said key being accessible to said plurality of processors only when executing said secure boot up software.

The present technique is secure as the boot up software used may be secure boot up software that is stored in ROM and hence cannot be changed by an attacker and the key is only accessible to the processor when executing the boot up software and is generally invisible to the processor at other times.

In some embodiments, said check state request comprises a random value, said processor on power up being controlled to combine said measurement with said random value, said value indicative of said measurement comprising said measurement combined with said random value.

One further way of ensuring security is if the check state request comprises a random value associated with it. If this random value is combined with the measurement then when this value is output and analysed one can determine if it has the correct random value associated with it and if so, then it has been generated in response to that particular check state request. In this way, values that have been generated at other times, perhaps in response to software trying to compromise the system, can be recognised as not being trustworthy as they do not have the correct random value.

In some embodiments, said processor on power up is configured to combine said value indicative of said measurement with said random value by forming a cryptographic hash of said two values and to sign said combined value with said key.

One way of combining the random value with the measurement value is to form a cryptographic hash of the two values and to sign the combined value with the key. In this way, a value from which both the random value and the key can be derived is provided.

In some embodiments, said data processing apparatus further comprises a memory accessible to said plurality of processors, and said measurement comprises reading code stored in a predefined region of said memory and said value indicative of said measurement comprises a result of a cryptographic hash operation performed on said code.

The measurement may be performed on any piece of code that it is important has not be compromised and which has a known value. In some embodiments, this may be the hypervisor code or for a system with secure and non-secure execution environments, it may be the monitor mode code, which is the code which controls any switching between the secure and non-secure side.

In some embodiments, said power control circuitry is configured to respond to receipt of said check state request, to control one of said plurality of processors that is currently powered down to power up and to access said boot up software at a predefined address, said boot up software accessed at said predefined address controlling said processor to perform said measurement.

In order to perform the required measurements, the boot up code needs to be directed towards the software controlling the measurement. This may be done by the power control circuitry that would respond to the check state request to access the boot up software at a predefined address. This predefined address is different to the predefined address during normal power up and will result in the boot up software controlling the processor to perform the measurement at some point during the initialisation of the device.

In some embodiments, said predefined address is stored in a predefined data store accessible to each of said plurality of processors.

The predefined address may be provided in a data store which is accessible for each of the processors. This may for example be a secure register, the power controller directing the boot up to start at the address stored in this register.

In some embodiments, said power control circuitry is configured to respond to receipt of said check state request to set a check state value in a data store shared between said plurality of processors, said boot up software being configured to control said processor to read said value in said data store and in response to detecting said check state value to execute software for controlling said processor to perform said measurement.

Alternatively, there may be a check state value that is in a data store whose value can be set by the processors. On boot up, the boot up software will read this value and if it is set it will execute the software to perform the measurement and if it isn't it will do the usual boot up software routine.

In some embodiments, said boot up software comprises verification code for loading and validating software, said boot up software being configured to respond to initialisation triggered by said check state request to load and validate measurement software and following successful validation of said measurement software to perform said measurement by executing said measurement software on said processor.

Boot up code often contains verification code for loading and validating software, as the loading of the software for a processor is often performed at boot up and it is important that only validated software is loaded. Thus, this verification code may already be present in the boot up software and can be reused for this technique to load and validate measurement software which can then be executed. In this way, the measurements that can be performed to check the state can be changed depending on circumstances by simply changing the measurement code which the boot up software will load. This code that is changed will need to be verifiable by the loading software. One way of doing this is to sign the code prior to storing it using the private part of a key that is available to the boot up code and whose public part is securely stored within the processor. In this way the code can be verified using the public key that is accessible at this time.

In some embodiments, one of said plurality of processors is configured to generate said check state request.

The check state request may be generated internally by the processing apparatus itself. In such a case one of the processors may perhaps periodically generate a check state request or may generate a check state request in response to performing certain tasks where it considers the processing apparatus may have become compromised. In other embodiments such a request will be received from an external device which wishes to check the device it is connected to is trustworthy and has not been compromised.

In some embodiments, said power control circuitry is configured to respond to receipt of said check state request to determine which of said plurality of processors is currently powered down and in response to determining that all of said plurality of processors are currently active, said power control circuitry is configured to return a response indicating that no check state can currently be performed and indicating said check state request should be transmitted again later.

Generally in a multiprocessor system one or more of the processors will be powered down at any one time. However, on some occasions they may all be powered up and if a check state request is received at such a time then the processor may respond with an indication that the check state request cannot currently be processed and the request should be resent later. Alternatively, the power control circuitry may determine what the current workload of the processors is and if one of the processors is not performing a particularly high priority task, or if that task could be given to another processor, then it will transfer the workload from that processor to another and power that processor down. The powered down processor can then be powered up and perform the measurement.

A second aspect of the present invention provides a method of checking a state of a data processing apparatus formed on an integrated circuit comprising a plurality of processors, said method comprising:

receiving a check state request;

powering up one of said plurality of processors that is currently powered down;

accessing and executing boot up software;

performing a measurement indicative of a current state of said data processing apparatus under control of said boot up software running on said processor that is powering up; and outputting a value indicative of said measurement.

A third aspect of the present invention provides a computer program for controlling a data processor to perform the steps in the method according to a second aspect of the present invention.

A fourth aspect of the present invention provides a data processing apparatus formed on an integrated circuit comprising:

a plurality of processing means for processing data;

power control circuitry configured to control power up and power down of said plurality of processing means;

a read only memory means for storing boot up software for booting up each of said plurality of processing means; wherein said power control means is for controlling one of said plurality of processing means that is currently powered down to power up in response to receipt of a check state request, and to access said boot up software, said boot up software accessed in response to said check state request controlling said processing means to perform at least some initialising functions and to perform a measurement indicative of a current state of said data processing apparatus and to output a value indicative of said measurement.

The above, and other objects, features and advantages of this invention will be apparent from the following detailed description of illustrative embodiments which is to be read in connection with the accompanying drawings.

DESCRIPTION OF THE EXAMPLE
NON-LIMITING EMBODIMENTS

Figure 1:
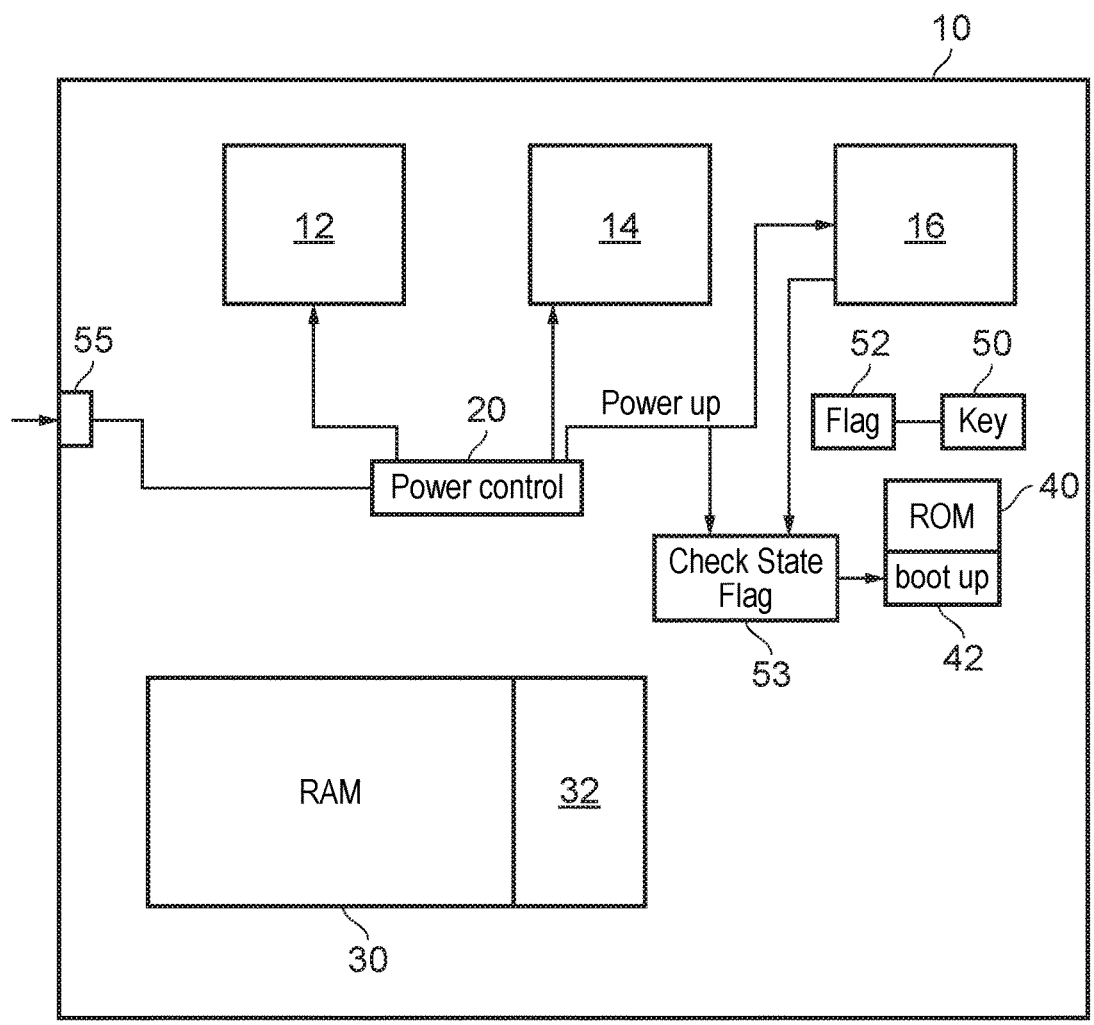
FIG. 1 shows a data processing apparatus according to an embodiment of the present invention.

FIG. 1 shows the data processing apparatus 10 according to an embodiment of the present invention. Data processing apparatus 10 has three processors 12, 14 and 16. It also has power control circuitry 20 for controlling the state of these processors. In this regard, in order to conserve power when one of the processors is not required it is powered down and when it is required again it will be powered up in response to control signals from the power control circuitry 20.

There is also a memory RAM 30 for storing data processed by the processors and there is a read only memory ROM 40 for storing permanent data such as the boot up software 42. This boot up software 42 is executed on power up to initialise a system. There is also a secure key 50 that is present within the data processing apparatus 10 and is accessible from the boot up software. When the boot up software has completed execution its final task will be to set flag 52 which renders the key 50 invisible to the processing apparatus. In this way, the key can only be accessed from the boot up software.

On power up of the device the boot up code 42 will be executed by a processor and various portions of software which may be stored within a non-volatile store 32 will be loaded onto the processing apparatus using the boot up software. The boot up software will verify that the software to be loaded is trustworthy by using a further key, the private part of which is owned by the manufacturer and used to sign the code and the public part of which is stored in the ASIC (application specific integrated circuit) and is used to verify signatures on the code. The code that is loaded during boot up is code required for the processing apparatus to function such as the hypervisor software. The signature for that code may be stored as a certificate associated with the code and stored in flash that is the non-volatile store 32.

In this embodiment, there is also an external port 55 which receives requests from external devices. A check state request may for example be received at this port, perhaps from an apparatus which wishes to link to this processing apparatus but which prior to transferring data with it wishes to determine that it has not been compromised and that it is operating in a trustworthy state. In response to this check state request power control circuitry 20 will determine which of the processors 12, 14 or 16 is currently powered down. If none of them are powered down it may determine whether workload permits one of them to be powered down and its current processing workload to be transferred to another processor. If they are all performing high priority tasks then it may respond to the check state request with a "call back later" signal indicating that it cannot currently process the check state request but if it is requested again later it will do so.

If it can accept the check state request, then the power control circuitry 20 will transmit a power up signal to a processor that is currently powered down. The power control circuitry 20 will also set the check state flag 53 that is present in a register that is accessible to all of the processors, at this time.

In this example the power up signal is sent to processor 16 and on initialisation processor 16 will check the value of the check state flag 53 and if it has been set indicating that the power up is in response to a check state request, the processor 16 will access the boot up code 42 at a certain predefined address. This address is such that some initialisation functions will be performed and then measurement software will be accessed to perform a measurement to provide an indication of the current state of the processor.

This measurement software will be stored in the non-volatile portion 32 of the RAM 30 or in some embodiments it may be stored within the ROM itself. The measurement software on execution will perform some mathematical operation on a portion of the code within the processing apparatus and will return the result. This result will be signed by secure key 50 and can then be output in response to the check state request.

The portion of code that the measurement is performed on may be the hypervisor code or it may be some other critical code such as the monitor mode code which for a processing apparatus having secure and non-secure states controls the switching between these states.

The measurement performed comprises a mathematical operation performed on the code such as generating a hash from the values. This hash is then signed with the secure key 50. The external device that has queried the state of the processing apparatus can retrieve the measurement value and with the public version of the secure key 50 can determine whether the code is as expected and whether it has been signed with the correct key. In this way, if it determines that the code is as expected and has been signed with the secure key 50, then it can be confident that this value has been generated by the boot up software, as this key is only accessible when executing the boot up software and thus, it can be confident that the value sent has not been tampered with.

Figure 2:
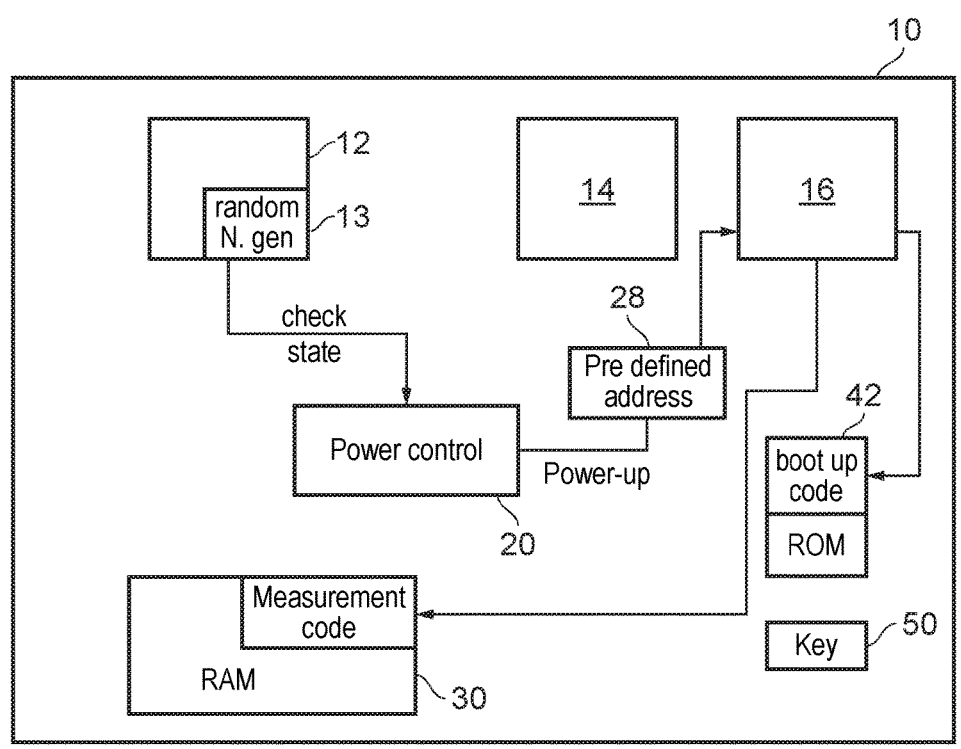
FIG. 2 shows a data processing apparatus according to a further embodiment of the present invention.

FIG. 2 shows an alternative embodiment of the current invention. In this embodiment the data processing apparatus 10 also has three processors 12, 14 and 16 and in this embodiment the check state request is not received from an external device but is generated by one of the processors. Thus, in this case processor 12 generates a check state request in response to determining that the processor has switched from non-secure to secure state and it wishes to determine that the processor has not been compromised while running in the non-secure state. Thus, it generates a check state request and a random number generated by random number generator 13 is sent along with this check state request.

Power control circuitry 20 responds to this check state request by determining whether any of the processors are currently powered down. In this case processor core 16 is currently powered down so power control circuitry transmits a power up request to processor 16 and at the same time it sets a pointer in register 28 that points to a predefined address in the boot up code 42.

On receipt of the power up request processor core 16 will access register 28 and in response to finding a predefined address stored therein will access the boot up code 42 at this predefined address. In this embodiment, boot up code when accessed at this address will control processor 16 to access a portion of RAM 30 which stores measurement code for performing the check state measurements.

Processor 16 executing the boot up code, will validate this software by determining a value of a key that has been used to sign the code and checking that it corresponds to the secure key 50 accessible only from this boot up code. Assuming the software is correctly validated then the processor 16 will execute this code and in response to the code will perform mathematical operations, in this case a hash on the hypervisor code and on the random number it received with the check state request. It will then sign this value using the secure key 50.

The resultant value is then sent back to the processor 12 which transmitted the request. Processor 12 will determine whether the value sent was signed with the correct key, contains the random number that it expects and that the code was as expected. As the value received can be determined to have been generated with both the random number and the secure key 50, processor 12 can be sure that it was generated in response to its request using the secure boot up code.

Thus, it can trust the value that is received and if the result is the result it expects it can be confident that the hypervisor code has not been tampered with.

Figure 3:
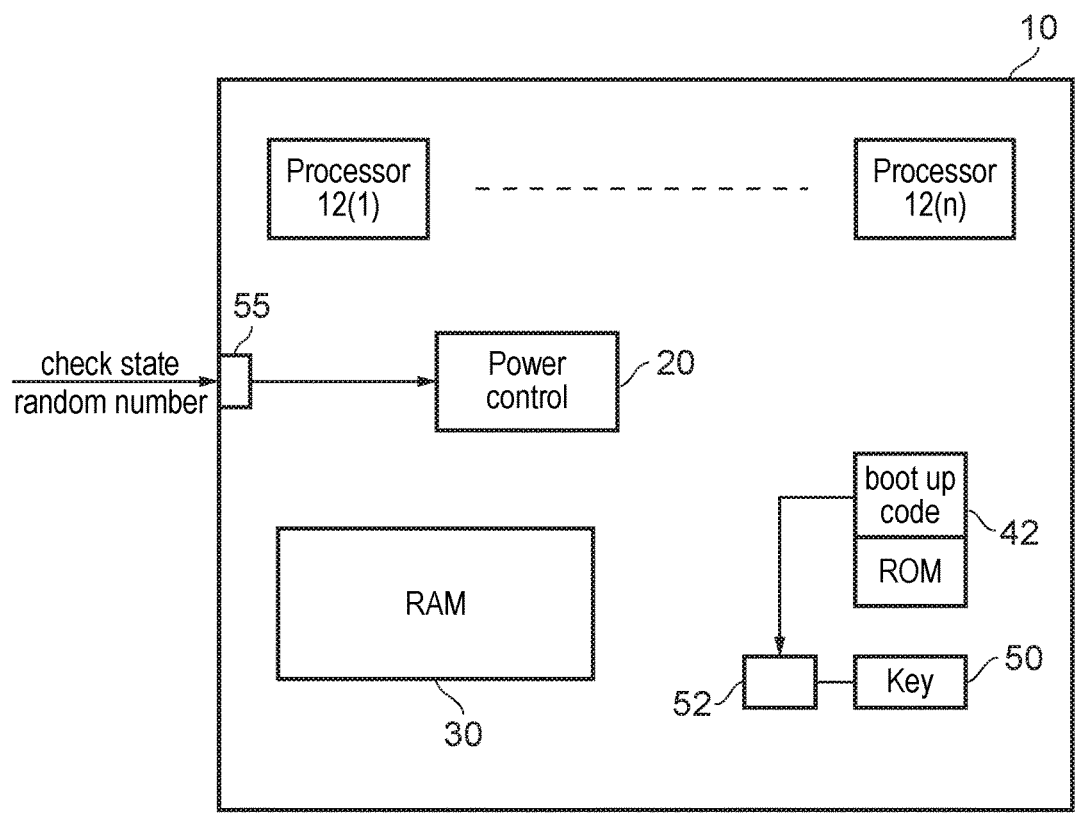
FIG. 3 shows an alternative embodiment of a data processing apparatus.

FIG. 3 shows an alternative embodiment of the present invention having n processors 12(1) to 12(n), power control circuitry 20, a ROM that stores boot up code 42 and a secure register 50, with a visibility flag 52. Secure register 50 stores a secure asymmetric private key that is unique to the device and is only accessible or indeed visible when executing the boot up code. In this regard, the boot up code 42 sets the visibility flag before finishing, this flag being set renders the key not visible to the processors. The flag may be reset by the boot up code at the start of its execution such that during execution of this code the key is visible and accessible.

In this embodiment there is an input 55 for receiving external requests including a check state request, which in this embodiment may have a random number associated with it. In response to this request, the power control circuitry 20 will power up one of the n processors that are currently powered down. The processor powered up will access the boot up code 42 at a predetermined address, this address is different to the address that boot up code is accessed at in response to a general power up request.

The boot up code accessed and executed by the powered up processor will perform some initialisation processes and will set the flag 52 associated with key 50 such that the key becomes visible. The processor will then perform some measurements of the current state of the processing apparatus 10. The measurements will return a measured value, which will then be combined with the random number received with the request and will be signed with key 50 and returned to the requesting apparatus.

This apparatus will be able to determine if the measured value is as expected and if the value has been generated from the random number sent and has been signed with the correct key. In this regard the requesting apparatus will have a public copy of the secure private key 50 and can determine from this if the signed value has been signed with that key.

Figure 4:
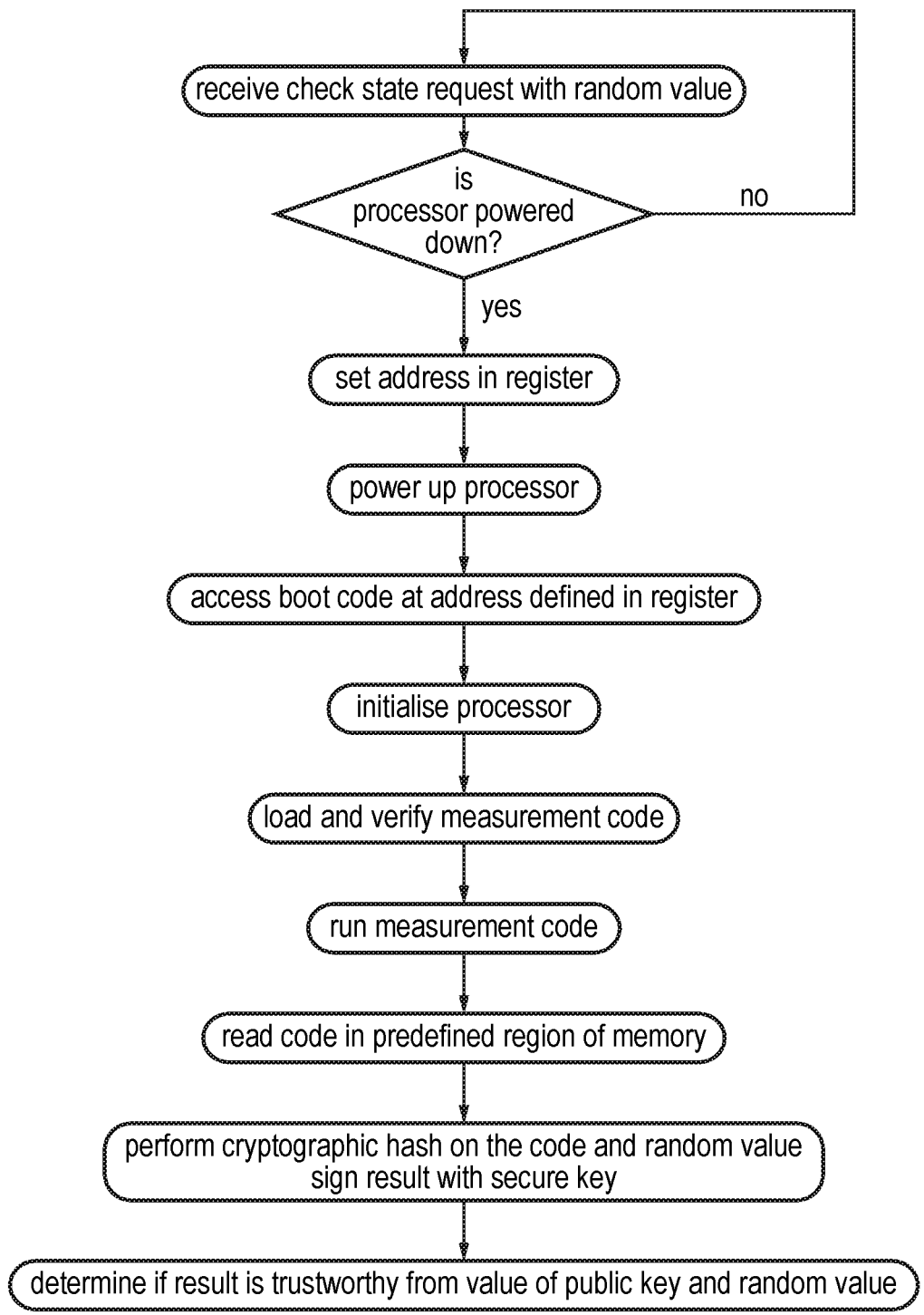
FIG. 4 shows a flow diagram illustrating steps of a method according to an embodiment of the present invention.

FIG. 4 shows a flow diagram illustrating steps in a method according to an embodiment of the present invention. A check state request is received that has a random value associated with it. The power control circuitry then determines if there is a processor that is currently powered down. In this embodiment if there is not currently a powered down processor then a response to the request is sent saying call back later.

If there is a processor that is currently powered down, then an address is set in a register and the processor is powered up. The processor that is powered up checks the register and in response to the address accesses the boot up code at the address stored in the register. The boot up code accessed at this point will provide an alternative boot up routine to that executed in response to a general power up command.

In this regard, initialising functions will be performed, but also measurement code will be loaded and verified from a predetermined place in the memory. In general boot up code will load software that is required for the processing apparatus to function. This code will include such things as hypervisor code. The boot up will also generally verify this code to determine that it isn't being loaded up with code that has been tampered with that might break the system. This verification may be performed by checking that the code has been signed by the expected key. In this regard the code will have been signed by the private part of the manufacturer's key and the signature for that code may be stored as a certificate associated with the code. This signature can be verified with the public part of the key that is stored on the processing apparatus.

As such code for loading software is already present in the boot up code it can be re-used to load and verify the measurement code. Storing measurement code in memory means that it can be changed, such that different things can be measured depending on what needs to be checked.

The measurement code is then executed and in response to it, a measurement on the state of the system is made. This measurement may be to read code that is stored in a predefined region of memory and perform some mathematical operation on the read code. In this case a cryptographic hash is performed on the measured code and the random value received with the request and the result is signed using the secure key.

The result is then returned to the device that sent the request and from this it can determine if the current state of the apparatus is as expected. In this regard, it will not have a version of the secure key itself but will have the public version of the key such that it can verify that the value it received was indeed signed with the corresponding private key.

Although illustrative embodiments have been described in detail herein with reference to the accompanying drawings, it is to be understood that the claims are not limited to those precise embodiments, and that various changes and modifications can be effected therein by one skilled in the art without departing from the scope and spirit of the appended claims. For example, various combinations of the features of the following dependent claims could be made with the features of the independent claims.

I claim:

1. A method, comprising:
   receiving a request to determine a state of a data processing apparatus;
   identifying a processing element to perform the determination;
   determining, using the processing element, the state of the data processing apparatus, wherein the determining the state of the data processing apparatus comprises performing one or more measurements of characteristics of the data processing apparatus,
   outputting a value indicative of the measurement, wherein the output value corresponds to a current power state of the data processing apparatus and the current power state of the data processing apparatus includes a current processing workload measurement of the processing element;
   transferring a workload from the processing element to another processing element on the data processing apparatus; and
   changing the current power state of the data processing apparatus to a second, lower power state in which the data processing apparatus is powered down.

2. A method as claimed in claim 1, further comprising enabling the processing element to perform the determination.

3. A method as claimed in claim 2, wherein the enabling the processing element comprises adjusting a power state of the processing element.

4. A method as claimed in claim 3, wherein the adjusting a power state comprising providing power to the processing element.

5. A method as claimed in claim 1, further comprising reading code from a data store and using the code to perform the determining.

6. A non-transitory program storage device, readable by a data processing apparatus, comprising a data store accessible to one or more of a plurality of processing elements of the data processing apparatus, having code stored thereon to cause a first processing element of the plurality of processing elements to:
   identify another of the one or more processing elements in a first power state;
   enable the another of the plurality of processing elements to change to a second power state;
   cause the another of the plurality of processing elements to perform one or more measurements of characteristics of the data processing apparatus;
   output a value indicative of the measurement, wherein the output value corresponds to a current power state of the data processing apparatus and the current power state of the data processing apparatus comprises a current processing workload measurement of the processing element;
   transfer a workload from the processing element to another processing element on the data processing apparatus; and
   change the current power state of the data processing apparatus to a second, lower power state in which the data processing apparatus is powered down.

* * * * *